(12) United States Patent
Aoki et al.

(10) Patent No.: US 8,107,683 B2
(45) Date of Patent: Jan. 31, 2012

(54) METHOD AND SYSTEM FOR IN-VEHICLE IMAGE PROCESSING

(75) Inventors: Tomoyoshi Aoki, Wako (JP); Sachio Kobayashi, Wako (JP); Naoki Mori, Wako (JP); Takuma Nakamori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1145 days.

(21) Appl. No.: 11/918,344

(22) PCT Filed: Mar. 28, 2006

(86) PCT No.: PCT/JP2006/306313
§ 371 (c)(1),
(2), (4) Date: Oct. 12, 2007

(87) PCT Pub. No.: WO2006/117951
PCT Pub. Date: Nov. 9, 2006

(65) Prior Publication Data
US 2008/0317288 A1    Dec. 25, 2008

(30) Foreign Application Priority Data
Apr. 28, 2005   (JP) .................................. 2005-133278

(51) Int. Cl.
*G06K 9/00* (2006.01)
(52) U.S. Cl. ........ 382/104; 382/100; 382/168; 382/171; 382/199; 348/118; 701/1; 701/23; 701/28; 701/117
(58) Field of Classification Search .................. None
See application file for complete search history.

(56) References Cited

U.S. PATENT DOCUMENTS

| | | | | |
|---|---|---|---|---|
| 5,790,403 A | * | 8/1998 | Nakayama | ...................... 701/28 |
| 6,091,833 A | * | 7/2000 | Yasui et al. | ................... 382/104 |
| 6,493,458 B2 | * | 12/2002 | Yasui et al. | ................... 382/104 |

(Continued)

FOREIGN PATENT DOCUMENTS

JP        08-202877 A        8/1996
(Continued)

OTHER PUBLICATIONS

Cheng H et al., "Springrobot: A Prototype Autonomous Vehicle and Its Algorithms for Lane Detection", IEEE Transactions on Intelligent Transportation Systems, Dec. 1, 2004, pp. 300-308, vol. 5, No. 4, Piscataway, NJ, US.

(Continued)

*Primary Examiner* — Sath V Perungavoor
*Assistant Examiner* — Jason Heidemann
(74) *Attorney, Agent, or Firm* — Arent Fox LLP

(57) ABSTRACT

An image processing system and the like capable of improving recognition accuracy of a lane mark are provided. According to the image processing system of the present invention, a first processing unit (110) recognizes a lane mark candidate on the basis of the luminance of each pixel in a road image. Moreover, there are evaluated a first index which represents continuity of an edge of the lane mark candidate, a second index which represents conformance between the width of the lane mark candidate and a lane mark standard width, and a third index which represents uniformity of the luminance of pixels contained in the lane mark candidate. According to the first, second, and third indices, a second processing unit (120) recognizes a lane mark candidate most likely to be a true lane mark as a lane mark.

16 Claims, 6 Drawing Sheets

U.S. PATENT DOCUMENTS

| | | | |
|---|---|---|---|
| 6,813,370 B1 * | 11/2004 | Arai | 382/104 |
| 6,819,779 B1 | 11/2004 | Nichani | |
| 6,829,388 B1 | 12/2004 | Sakurai | |
| 7,362,883 B2 * | 4/2008 | Otsuka et al. | 382/104 |
| 7,421,095 B2 * | 9/2008 | Ikeda et al. | 382/104 |
| 2001/0033225 A1 * | 10/2001 | Razavi et al. | 340/425.5 |
| 2002/0042668 A1 * | 4/2002 | Shirato et al. | 701/1 |
| 2004/0158366 A1 * | 8/2004 | Dieterle | 701/23 |

FOREIGN PATENT DOCUMENTS

| | | |
|---|---|---|
| JP | 09-198505 A | 7/1997 |
| JP | 09-218937 A | 8/1997 |
| JP | 11-085999 A | 3/1999 |
| JP | 11-147473 A | 6/1999 |
| JP | 11-147481 A | 6/1999 |
| JP | 11-195127 A | 7/1999 |
| JP | 2004-062519 A | 2/2004 |
| JP | 2004-145501 A | 5/2004 |

OTHER PUBLICATIONS

Postel J, et al., "File Transfer Protocol (FTP)", IETF Standard, Internet Engineering Task Force, IETF, CH, Oct. 1, 1985.

* cited by examiner

METHOD AND SYSTEM FOR IN-VEHICLE IMAGE PROCESSING

CROSS-REFERENCE TO RELATED APPLICATION

This application is a National Stage entry of International Application No. PCT/JP2006/306313, filed Mar. 28, 2006, the entire specification claims and drawings of which are incorporated herewith by reference.

TECHNICAL FIELD

The present invention relates to a vehicle, an image processing system, an image processing method, a program which gives a computer the image processing functions concerned, a method of configuring the system, and a server which executes the method.

BACKGROUND ART

Conventionally, there has been suggested an image processing method for recognizing a lane mark such as a white line on the basis of a road image ahead of a vehicle captured by an imaging device mounted on the vehicle (for example, refer to Japanese Patent Laid-Open No. Hei 11 (1999)-147473 and Japanese Patent Laid-Open No. Hei 11 (1999)-147481). The recognition result of the lane mark is used, for example, in order to control the lateral position of the vehicle with reference to the position of the lane marks which lie on either side of the vehicle. According to the conventional technology, the white lines (or their edges) are recognized by using a property that the luminance of the white lines contained in the road image is higher than that of other portions of the road.

DISCLOSURE OF THE INVENTION

Problems to be Solved by the Invention

According to the conventional technology, however, if there is a shadow of a guard rail or the like or a road repair mark around the white line, a difference occurs in the luminance in the road image and thus there is a possibility that a portion other than the white line is recognized as a white line, which could lead to a need to stop the lateral position control of the vehicle in order to prevent the lateral position control of the vehicle based on the recognition result of the white line from inappropriately bringing discomfort to a driver in light of an actual white line.

Means for Solving the Problems

Therefore, it is an object of the present invention to provide an image processing system and an image processing method capable of improving recognition accuracy of a lane mark, a vehicle equipped with the image processing system, and a program which gives a computer the image processing functions concerned.

To solve the above problem, according to the present invention, there is provided a vehicle equipped with: an imaging device; an image processing system which performs image processing on the basis of a road image captured by the imaging device; and a vehicle running condition control system which controls a running condition of the vehicle on the basis of a result of the image processing performed by the image processing system, wherein the image processing system includes: a first processing unit which recognizes a lane mark candidate on the basis of the luminance of each pixel in the road image captured by the imaging device; a first evaluation unit which evaluates a first index which represents continuity of an edge of the lane mark candidate recognized by the first processing unit; a second evaluation unit which evaluates a second index which represents conformance between the width of the lane mark candidate recognized by the first processing unit and a lane mark standard width; a third evaluation unit which generates a luminance histogram of pixels contained in the lane mark candidate recognized by the first processing unit and then evaluates a third index which represents a variation in the luminance space of the histogram; and a second processing unit which recognizes a lane mark candidate most likely to be a true lane mark as a lane mark on the basis of the first, second, and third indices evaluated by the first, second, and third evaluation units, respectively.

A lane mark such as a white line has continuous edges, a width approximately coincident with a standard width, and a luminance approximately uniform in comparison with a road surface with a mixture of light and dark areas. According to the vehicle of the present invention, in view of the conditions, the vehicle-mounted image processing system selects a lane mark out of lane mark candidates on the basis of the "first index" which represents the continuity of the edge of the lane mark candidate, the "second index" which represents the conformance between the width (including an average of widths at a plurality of locations) of the lane mark candidate and the lane mark standard width, and the "third index" which represents a variation in the luminance space of the luminance histogram of pixels contained in the lane mark candidate. Thereby, a lane mark candidate most likely to be a true lane mark can be recognized among the lane mark candidates. Therefore, the recognition accuracy of the lane mark can be improved, which causes the running condition control of the vehicle based on the recognition result to be appropriate in light of an actual relative positional relationship between the vehicle and the lane mark.

Moreover, the vehicle according to the present invention is characterized in that the first evaluation unit sets an approximate expression of the edge of the lane mark candidate on the basis of a plurality of edge points of the lane mark candidate recognized by the first processing unit and evaluates the first index according to an increasing function of a difference between the plurality of edge points and the approximate expression.

According to the vehicle of the present invention, in the vehicle-mounted image processing system, the more smoothly the edge of the lane mark candidate continues (the higher the continuity is), the smaller the difference between the approximate expression of the edge and the edge point and thus the lower the first index is evaluated. Therefore, a lane mark candidate whose first index is smaller is more likely to be recognized as a lane mark. This improves the recognition accuracy of the lane mark and causes the running condition control of the vehicle based on the recognition result to be appropriate in view of the actual relative positional relationship between the vehicle and the lane mark.

Moreover, the vehicle according to the present invention is characterized in that the second evaluation unit selects a lane mark standard width closest to the width of the lane mark candidate recognized by the first processing unit among a plurality of lane mark standard widths and evaluates the second index according to an increasing function of a deviation between the width of the lane mark candidate and the selected lane mark standard width.

According to the vehicle of the present invention, the vehicle-mounted image processing system evaluates the second index with reference to the most likely lane mark standard width in view of the fact that there is a variation in the lane mark standard width due to a difference in the province such as a country, state, or municipal division where the road exists, a difference in the period when the lane mark is provided on the road, or the like. Furthermore, more uniformly the width of the lane mark candidate conforms to the lane mark standard width (the higher the conformance to the lane mark standard width is), the lower the second index is evaluated. Therefore, a lane mark candidate whose second index is smaller is more likely to be recognized as a lane mark. This improves the recognition accuracy of the lane mark and causes the running condition control of the vehicle based on the recognition result to be appropriate in view of the actual relative positional relationship between the vehicle and the lane mark.

Moreover, the vehicle according to the present invention is characterized in that the third evaluation unit divides the histogram so as to include only one peak, calculates indices each representing the variation in the luminance space of each divided histogram, and evaluates the third index on the basis of the indices if the histogram contains a plurality of peaks.

There is a possibility that the luminance histogram has a plurality of peaks due to a shadow partially thrown on the lane mark. According to the vehicle of the present invention, the vehicle-mounted image processing system can evaluate the uniformity of the luminance of pixels in the lane mark candidate appropriately even if the histogram of the lane mark candidate varies in the luminance space due to an extrinsic factor such as a shadow in view of the above consideration. If the first index falls off or outside a first allowable range due to a discontinuous edge of a lane mark candidate or the second index falls off or outside a second allowable range due to the width of the lane mark candidate not conforming to the lane mark standard width, it is likely that a lane mark such as a white line had faded. In view of the consideration, according to the vehicle of the present invention, more importance is given to the uniformity of the luminance than the continuity of the edge and the like in the vehicle-mounted image processing system in this case, whereby even the fading lane mark can be recognized accurately. This improves the recognition accuracy of the lane mark and causes the running condition control of the vehicle based on the recognition result to be appropriate in view of the actual relative positional relationship between the vehicle and the lane mark.

Furthermore, the vehicle according to the present invention is characterized in that the third evaluation unit calculates a standard deviation as an index representing the variation in the luminance space of the histogram and evaluates the standard deviation as the third index.

According to the vehicle of the present invention, in the vehicle-mounted image processing system, the more uniform the luminance of pixels contained in the lane mark candidate is, the lower the standard deviation of the luminance histogram, namely the third index is evaluated. Therefore, a lane mark candidate whose third index is smaller is more likely to be recognized as a lane mark. If the first index falls off the first allowable range due to a discontinuous edge of the lane mark candidate or the second index falls off the second allowable range due to the width of the lane mark candidate not conforming to the lane mark standard width, it is likely that the lane mark such as a white line had faded. In view of the consideration, according to the vehicle of the present invention, more importance is given to the uniformity of the luminance than the continuity of the edge and the like in the vehicle-mounted image processing system in this case, whereby even the fading lane mark can be recognized accurately. This improves the recognition accuracy of the lane mark and causes the running condition control of the vehicle based on the recognition result to be appropriate in view of the actual relative positional relationship between the vehicle and the lane mark.

Still further, the vehicle of the present invention is characterized in that, if the first index evaluated by the first evaluation unit falls off the first allowable range or if the second index evaluated by the second evaluation unit falls off the second allowable range, the second processing unit recognizes the lane mark with the importance of the third index being set to be higher than the importance of the first index and that of the second index.

If the first index falls off the first allowable range due to a discontinuous edge of the lane mark candidate or the second index falls off a second allowable range due to the width of the lane mark candidate not conforming to the lane mark standard width, it is likely that the lane mark such as a white line had faded. In view of the consideration, according to the vehicle of the present invention, more importance is given to the uniformity of the luminance than the continuity of the edge and the like in the vehicle-mounted image processing system in this case, whereby even the fading lane mark can be recognized accurately. This improves the recognition accuracy of the lane mark and causes the running condition control of the vehicle based on the recognition result to be appropriate in view of the actual relative positional relationship between the vehicle and the lane mark.

To solve the above problem, according to the present invention, there is provided an image processing system comprising: a first processing unit which recognizes a lane mark candidate on the basis of the luminance of each pixel in a road image captured by a vehicle-mounted imaging device; a first evaluation unit which evaluates a first index which represents continuity of an edge of the lane mark candidate recognized by the first processing unit; a second evaluation unit which evaluates a second index which represents conformance between the width of the lane mark candidate recognized by the first processing unit and a lane mark standard width; a third evaluation unit which generates a luminance histogram of pixels contained in the lane mark candidate recognized by the first processing unit and then evaluates a third index which represents a variation in the luminance space of the histogram; and a second processing unit which recognizes a lane mark candidate most likely to be a true lane mark as a lane mark on the basis of the first, second, and third indices evaluated by the first, second, and third evaluation units, respectively.

According to the image processing system of the present invention, a lane mark is selected out of the lane mark candidates on the basis of the "first index" which represents the continuity of the edge of the lane mark candidate, the "second index" which represents the conformance between the width of the lane mark candidate and the lane mark standard width, and the "third index" which represents a variation in the luminance space of the luminance histogram of pixels contained in the lane mark candidate. Thereby, the lane mark candidate most likely to be a true lane mark can be recognized among the lane mark candidates. Therefore, the recognition accuracy of the lane mark can be improved.

Furthermore, the image processing system according to the present invention is characterized in that the first evaluation unit sets an approximate expression of the edge of the lane mark candidate on the basis of a plurality of edge points of the lane mark candidate recognized by the first processing unit and evaluates the first index according to an increasing function of a difference between the plurality of edge points and the approximate expression.

Further, the image processing system according to the present invention is characterized in that the second evaluation unit selects a lane mark standard width closest to the width of the lane mark candidate recognized by the first processing unit among a plurality of lane mark standard widths and evaluates the second index according to an increasing function of a deviation between the width of the lane mark candidate and the selected lane mark standard width.

Furthermore, the image processing system according to the present invention is characterized in that the third evaluation unit divides the histogram so as to include only one peak, calculates indices each representing the variation in the luminance space of each divided histogram, and evaluates the third index on the basis of the indices if the histogram contains a plurality of peaks.

Still further, the image processing system according to the present invention is characterized in that the third evaluation unit calculates a standard deviation as the index representing the variation in the luminance space of the histogram and evaluates the standard deviation as the third index.

Further, the image processing system according to the present invention is characterized in that, if the first index evaluated by the first evaluation unit falls off the first allowable range or if the second index evaluated by the second evaluation unit falls off the second allowable range, the second processing unit recognizes the lane mark with the importance of the third index being set to be higher than the importance of the first index and that of the second index.

To solve the above problem, according to the present invention, there is provided an image processing method comprising: a first processing step of recognizing a lane mark candidate on the basis of the luminance of each pixel in a road image captured by a vehicle-mounted imaging device; a first evaluation step of evaluating a first index which represents continuity of an edge of the lane mark candidate recognized in the first processing step; a second evaluation step of evaluating a second index which represents conformance between the width of the lane mark candidate recognized in the first processing step and a lane mark standard width; a third evaluation step of generating a luminance histogram of pixels contained in the lane mark candidate recognized in the first processing step and evaluating a third index which represents a variation in the luminance space of the histogram; and a second processing step of recognizing a lane mark candidate most likely to be a true lane mark as a lane mark on the basis of the first, second, and third indices evaluated in the first, second, and third evaluation steps, respectively.

According to the image processing method of the present invention, a lane mark most likely to be a true lane mark can be recognized among lane mark candidates, in view of the fact that a lane mark has continuous edges, a width approximately coincident with the standard width, and a luminance approximately uniform in comparison with the road surface with a mixture of light and dark areas.

To solve the above problem, according to the present invention, there is provided an image processing program which gives a computer: a first processing function of recognizing a lane mark candidate on the basis of the luminance of each pixel in a road image captured by a vehicle-mounted imaging device; a first evaluation function of evaluating a first index which represents continuity of an edge of the lane mark candidate recognized by the first processing function; a second evaluation function of evaluating a second index which represents conformance between the width of the lane mark candidate recognized by the first processing function and a lane mark standard width; a third evaluation function of generating a luminance histogram of pixels contained in the lane mark candidate recognized by the first processing function and evaluating a third index which represents a variation in the luminance space of the histogram; uniformity of the luminance of pixels contained in the lane mark candidate recognized by the first processing function; and a second processing function of recognizing a lane mark candidate most likely to be a true lane mark as a lane mark on the basis of the first, second, and third indices evaluated by the first, second, and third evaluation functions, respectively.

According to the image processing program of the present invention, the computer is given the function allowing the lane mark most likely to be a true lane mark to be recognized among lane mark candidates, in view of the fact that a lane mark has continuous edges, a width approximately coincident with the standard width, and a luminance approximately uniform in comparison with the road surface with a mixture of light and dark areas.

To solve the above problem, according to the present invention, there is provided a method of downloading a part or all of the vehicle-mounted image processing program to an in-vehicle computer in order to configure the image processing system.

According to the method of the present invention, it is possible to configure the image processing system, which is capable of improving the recognition accuracy of the lane mark by recognizing the lane mark candidate most likely to be a true lane mark among the lane mark candidates, by downloading a part or all of the program to the in-vehicle computer at an arbitrary timing.

To solve the above problem, according to the present invention, there is provided a server which performs the foregoing method.

According to the server of the present invention, a part or all of the image processing program is downloaded to the in-vehicle computer at an arbitrary timing.

BEST MODE FOR CARRYING OUT THE INVENTION

Preferred embodiments of a vehicle, an image processing system, an image processing method, an image processing program, a method of configuring the system, and a server according to the present invention will be described below by using the accompanying drawings.

A vehicle 10 shown in FIG. 1 has an electronic control unit (computer) 11 and a camera (imaging device) 12 which captures a road image ahead of the vehicle 10. In addition, the vehicle 10 is equipped with sensors such as a speed sensor and a yaw rate sensor (not shown).

The electronic control unit 11 constitutes an image processing system 100 as hardware mounted on the vehicle 10, together with "an image processing program" of the present invention as software which gives various functions to the electronic control unit 11. While the image processing program can be stored in a memory of the electronic control unit (in-vehicle computer) 11 from the beginning, it is also possible to download a part or all of the image processing program from a given server 200 via a network at an arbitrary timing such as upon request from a driver or the in-vehicle computer. Moreover, the electronic control unit 11 constitutes a "vehicle running condition control system" which controls the running condition including the lateral position of the vehicle 10 on the basis of an image processing result of the image processing system 100.

The image processing system 100 includes a storage unit 101, a luminance measurement unit 102, a first processing unit 110, a first evaluation unit 111, a second evaluation unit 112, a third evaluation unit 113, and a second processing unit 120.

The storage unit 101 stores a plurality of standard widths or the like of a white line (lane mark).

The luminance measurement unit 102 measures the luminance of each pixel in the road image captured by the camera 12 mounted on the vehicle 10.

The first processing unit 110 recognizes a lane mark candidate on the basis of the luminance of each pixel in the road image measured by the luminance measurement unit 102.

The first evaluation unit 111 evaluates a "first index" which represents the continuity of an edge of the lane mark candidate recognized by the first processing unit 110.

The second evaluation unit 112 evaluates a "second index" which represents the conformance between the width of the lane mark candidate recognized by the first processing unit 110 and a lane mark standard width stored in the storage unit 101.

The third evaluation unit 113 evaluates a "third index" which represents the uniformity of the luminance of pixels contained in the lane mark candidate recognized by the first processing unit 110.

The second processing unit 120 recognizes the lane mark candidate most likely to be a true lane mark as a lane mark on the basis of the first, second, and third indices evaluated by the first evaluation unit 111, the second evaluation unit 112, and the third evaluation unit 113, respectively.

The image processing method executed by the image processing system having the above configuration will be described with reference to FIG. 2 to FIG. 7.

The first processing unit 110 performs a "first process" (S110 in FIG. 2).

Specifically, first, all edge points of a white line candidate are recognized (detected) on the basis of the luminance of points (pixels) in the road image measured by the luminance measurement unit 102 and stored in the storage unit 101. As a method of recognizing the edge points, it is possible to use, for example, a technique disclosed in Japanese Patent Laid-Open No. Hei 11 (1999)-85999, and therefore detailed description of the method is omitted in this specification. On the assumption that the screen scanning direction is shown on the right side, an edge point which changes from a high luminance level (light) to a low luminance level (dark) is recognized as a "negative edge point" and an edge point which changes from a low luminance level (dark) to a high luminance level (light) is recognized as a "positive edge point."

For example, it is assumed that a captured road image contains white lines (lane marks) M on both the left and right sides of a lane, shadows T caused by dents (wheel tracks of tires) in the positions closer to the center of the lane than the white lines M, and a shadow S thrown on the left white line M as shown in FIG. 3. The shadow on the white line M can be thought to be caused by a guard rail or a sign on the side of the road, a building or a plant on the side of the road, or a vehicle running on the adjacent lane or the like. In this case, as shown in FIG. 4, the points on the left edge of each white line M are recognized as positive edge points (each indicated by a plus sign "+") and the points on the right edge of each white line M are recognized as negative edge points (each indicated by a minus sign "−"). Moreover, the points on a partial edge of the shadow S on the left white line M are recognized as positive edge points and the points on the left edge of the shadow T caused by the left dent are recognized as negative edge points. This causes areas lying between a pair of the positive edge point group and the negative edge point group, in other words, the left white line M, the area lying between the shadow S and the shadow T, and the right white line M shown in FIG. 4 to be recognized as lane mark candidates (white line candidates) M1, M2, and M3, respectively.

Subsequently, the first evaluation unit performs a "first evaluation process" for evaluating the "first index" representing the continuity of the edge of the lane mark candidate recognized by the first processing unit 110 (S111 in FIG. 2).

Specifically, first, the first evaluation unit sets an approximate expression of the edge of the lane mark candidate on the basis of a plurality of edge points on the edge closer to the center of the lane of the lane mark candidate recognized by the first processing unit 110. For example, it calculates the values of parameters "a" and "b" by a least squares approximation or the like on the basis of a straight line (primary expression) y=ax+b (x: horizontal position in the image coordinate system, y: vertical position in the image coordinate system) and the coordinates of edge points of the lane mark candidate read from the storage unit 101 to thereby set the primary expression determined by the calculated values of the parameters as the approximate expression of the edge of the lane mark candidate. Moreover, the first evaluation unit calculates the values of parameters "a," "b," and "c" by a least squares approximation or the like on the basis of a quadratic equation Y=aX²+bX+c or other curve equation and the coordinates of edge points of the lane mark candidate read from the storage unit 101 to thereby set the curve equation such as the quadratic equation determined by the calculated values of the parameters as the approximate expression of the edge of the lane mark candidate. Alternatively, it is also possible to correct the approximate expression of the edge of the lane mark candidate on the basis of outputs of the yaw rate sensor, the speed sensor, or the like (not shown) mounted on the vehicle 10.

Then, an average of a difference $\Delta x_i$ (i=1, 2, - - - , n) between the plurality of edge points and the approximate expression in the x direction is calculated according to the following equation (1a) and is evaluated as a first index $p_1$.

$$p_1 = (1/n)\Sigma_i (f(y_i) \cdot \Delta x_i)^2 \quad (1a)$$

where "$f(y_i)$" in the equation (1b) is a weighting factor which is in proportion to a distance on the road surface per pixel in the x direction in $y=y_i$.

Thereby, the more smoothly the edge of the lane mark candidate continues (the higher the continuity is), the lower the first index $p_1$ is evaluated. For example, the average of the square of the difference between the straight line (or a curve) L represented by an approximate expression as shown in FIG. 5(a) and the edge points (each indicated by "x") in the x direction is smaller than the average of the square of the difference between the straight line L shown in FIG. 5(b) and the edge points in the x direction. Therefore, if the edge point group shown in FIG. 5(a) is recognized, the first index $p_1$ is evaluated to be lower than in the case where the edge point group shown in FIG. 5(b) is recognized.

Alternatively, it is possible to set the approximate expression of the edge after the edge points are projected and transformed from the image coordinate system (x, y) to the road coordinate system (X, Y) and to calculate the average of the square of the difference $\Delta X_i$ (i=1, 2, - - - , n) between the plurality of edge points and the approximate expression in the X direction according to the following equation (1b) before evaluating the average as the first index $p_1$.

$$p_1 = (1/n)\Sigma_i(\Delta X_i)^2 \quad (1b)$$

Moreover, the second evaluation unit 112 performs a "second evaluation process" for evaluating the "second index" which represents the conformance between the width of the lane mark candidate recognized by the first processing unit 110 and the lane mark standard width stored in the storage unit 101 (S112 in FIG. 2). Specifically, first, the second evaluation unit 112 selects a lane mark standard width which is closest to the standard deviation (or average) of a distance between a positive edge point and a negative edge point at a plurality of locations of the lane mark candidates in the road coordinate system among a plurality of lane mark standard widths stored in the storage unit 101. Thereafter, the second evaluation unit 112 calculates an average of a square of a difference between the distance $w_i$ (i=1, 2, - - - , m) between the positive edge point and the negative edge point at the plurality of locations of each lane mark candidate and the standard width $w_0$ concerned according to the following equation (2) before evaluating the average as a second index $p_2$.

$$p_2 = (1/m)\Sigma(w_i \times w_0)^2 \quad (2)$$

Thereby, the more uniformly the width of the lane mark candidate conforms to the lane mark standard width (the higher the uniformity to the lane mark standard width is), the lower the second index $p_2$ is evaluated. For example, the width $w_i$ at a plurality of locations generally matches the lane mark width $w_0$ in a lane mark candidate M1 extending with a uniform width as shown in FIG. 6(a) in comparison with a lane mark candidate M2 which is unstable in the width as shown in FIG. 6(b), and therefore the second index $p_2$ is evaluated to be low.

Alternatively, the standard width of the lane mark read from the storage unit 101 by the second evaluation unit 112 can be corrected on the basis of an output from the speed sensor or the yaw rate sensor (not shown) mounted on the vehicle 10 and an exposure time of the camera 12 stored in the storage unit 101 so as to reduce or eliminate "fluctuations" which may be caused in the road image by the speed or yaw rate of the vehicle 10 and the exposure time of the camera 12.

Moreover, the third evaluation unit 113 performs a "third evaluation process" for evaluating the "third index" which represents the uniformity of the luminance of pixels contained in the lane mark candidate recognized by the first processing unit 110 (S113 in FIG. 2). Specifically, the luminance of the pixels of the lane mark candidate recognized by the first processing unit 110 is read from the storage unit 101 and then a histogram of the luminance is generated. The abscissa axis of the histogram is divided into luminance sections each having a constant width, while the ordinate axis represents the cumulative number (frequency) of pixels each having a luminance included in each luminance section.

For example, the histogram of the lane mark candidate M1 located on the left side of the road image shown in FIG. 4 shows a wide range having a peak in both sides of the high luminance and the low luminance as shown in FIG. 7(a). The wide distribution in the histogram is caused by the shadow S partially thrown on the left white line M corresponding to the lane mark candidate M1 as shown in FIG. 3. The histogram on the high luminance side corresponds to a histogram of a portion where the shadow S is not thrown in the white line M and the histogram on the low luminance side corresponds to a histogram of a portion where the shadow S is thrown in the white line M.

On the other hand, the histogram of the luminance of the lane mark candidate M2 on the left side of the road image shown in FIG. 4 shows a narrow range which deviates to the low luminance side as shown in FIG. 7(b). It is because the lane mark candidate M2 corresponds to a road surface portion between the shadow S and the shadow T shown in FIG. 3 and the luminance of the road surface portion is generally low.

Moreover, the histogram of the luminance of the lane mark candidate M3 located on the right side of the road image shown in FIG. 4 shows a narrow range which deviates to the high luminance side as shown in FIG. 7(c). It is because the lane mark candidate M3 corresponds to the right white line M shown in FIG. 3 and the luminance of the white line M is generally high.

Then, a standard deviation (an index representing a variation) in a luminance space of the histogram of each lane mark candidate is calculated and evaluated as a third index $p_3$. Specifically, the third index $p_3$ is evaluated according to the following equation (3) on the basis of a representative luminance value bi such as a mean value and a frequency $h_i$ of a luminance section $B_i$ in the histogram.

$$p_3 = [\Sigma_i\{b_i h_i - M\}^2/(N-1)]^{1/2}$$

$$M = \Sigma_i b_i h_i / N$$

$$N = \Sigma_i h_i \quad (3)$$

If the histogram contains a plurality of peaks as shown in FIG. 7(a), however, the histogram is divided so as to contain only one peak, and the standard deviations (indices representing the variation) in the luminance space of the divided histograms are calculated, and an average of the standard deviations is evaluated as the third index $p_3$.

Thereby, the smaller the variation in the luminance space of the histogram of a lane mark candidate is, the lower the third index $p_3$ is evaluated.

Subsequently, a "second process" is performed to recognize a lane mark candidate most likely to be a true lane mark as a lane mark on the basis of the first index $p_1$, the second index $p_2$, and the third index $p_3$ evaluated by the first evaluation unit 111, the second evaluation unit 112, and the third evaluation unit 113, respectively (S120 in FIG. 2). Specifically, a lane mark candidate having the minimum sum of the first index $p_1$, the second index $p_2$, and the third index $p_3$ is selected from each of the left and right sides of the road image and recognized as a true lane mark.

For example, it is assumed that edge points of the lane mark candidate M1 shown in FIG. 4 are scattered generally along the approximate straight line L as shown in FIG. 5(a) and a width $w_i$ at a plurality of locations matches the standard width $w_0$ as shown in FIG. 6(a). On the other hand, it is assumed that the edge points of the lane mark candidate M2 shown in FIG. 4 are dotted while being deviated from the approximate straight line L as shown in FIG. 5(b) and the width $w_i$ at the plurality of locations is deviated from the standard width $w_0$ as shown in FIG. 6(b). In this case, the first index $p_1$ and the second index $p_2$ of the lane mark candidate M1 are lower than the first index $p_1$ and the second index $p_2$ of the lane mark candidate M2. Therefore, if both the third indices $p_3$ are nearly equal, the sum of the indices of the lane mark candidate M1 is smaller than the sum of the indices of the lane mark candidate M2. Thereby, the lane mark candidate M1 is selected as a lane mark on the left side of the road image. The vehicle running condition control system (the electronic control unit 11) controls the lateral position of the vehicle 10 on the basis of the left and right lane edges recognized by the second processing unit 120. As the control method, for example, it is possible to use a technique disclosed in Japanese Patent Laid-Open No. Hei 11 (1999)-147473 and Japanese Patent Laid-Open No. Hei 11 (1999)-147481, and therefore the description of the control method is omitted in this specification.

According to the image processing system 100 which performs the above method, a lane mark is selected out of lane mark candidates on the basis of the first index $p_1$ which represents the continuity of an edge of a lane mark candidate, the second index $p_2$ which represents the conformance between the width of the lane mark candidate and the lane mark standard width, and the third index $p_3$ which represents the uniformity of the luminance of pixels contained in the lane mark candidate, in view of the fact that a lane mark such as a white line has continuous edges, a width approximately coincident with the standard width, and a luminance approximately uniform in comparison with a road surface with a mixture of light and dark areas. Thereby, a lane mark candidate most likely to be a true lane mark can be recognized among the lane mark candidates. Therefore, the recognition accuracy of the lane mark can be improved, which causes the running condition control of the vehicle 10 based on the recognition result by the vehicle running condition control system to be appropriate in light of an actual relative positional relationship between the vehicle 10 and the lane mark or the like.

Moreover, the second evaluation unit 112 selects a standard width which is closest to the average of the widths of the lane mark candidate recognized by the first processing unit out of the plurality of lane mark standard widths stored in the storage unit 101 and then the second index $p_2$ is evaluated based on it. Therefore, the second index $p_2$ is evaluated with reference to the most likely lane mark standard width in view of the fact that there is a variation in the lane mark standard width due to a difference in the province such as a country, state, or municipal division where the road exists, a difference in the period when the lane mark is provided on the road, or the like.

Moreover, the third index $p_3$ which represents the uniformity of the luminance of pixels contained in the lane mark candidate can be appropriately evaluated by the use of the luminance histogram. In addition, the histogram is divided so as to include one peak (See FIG. 7(a)) in consideration of a possibility that the luminance histogram has a plurality of peaks due to the shadow S partially thrown on the lane mark M as shown in FIG. 3, and then the standard deviation is calculated for each divided histogram. This allows the third index $p_3$ which represents the uniformity of the luminance of pixels in the lane mark candidate to be appropriately evaluated even if the histogram of the lane mark candidate varies in the luminance space due to an extrinsic factor such as a shadow.

If the first index $p_1$ evaluated by the first evaluation unit 111 falls off a first allowable range or if the second index $p_2$ evaluated by the second evaluation unit 112 falls off a second allowable range, the second processing unit 120 can recognize the lane mark with the importance of the third index $p_3$ set higher than the importance of the first index $p_1$ and that of the second index $p_2$. More specifically, the weighting factor of the third index $p_3$ is set to be higher than other weighting factors in calculation of the weighted sum of the first index $p_1$, the second index $p_2$, and the third index $p_3$.

According to the embodiment, if a lane mark such as a white line is very likely to fade because the first index falls off the first allowable range due to a discontinuous edge of a lane mark candidate or the second index falls off the second allowable range due to the width of the lane mark candidate not conforming to the lane mark standard width, more importance is given to the uniformity of the luminance than the continuity of the edge or the like, whereby the fading lane mark can be recognized accurately.

Figure 1:
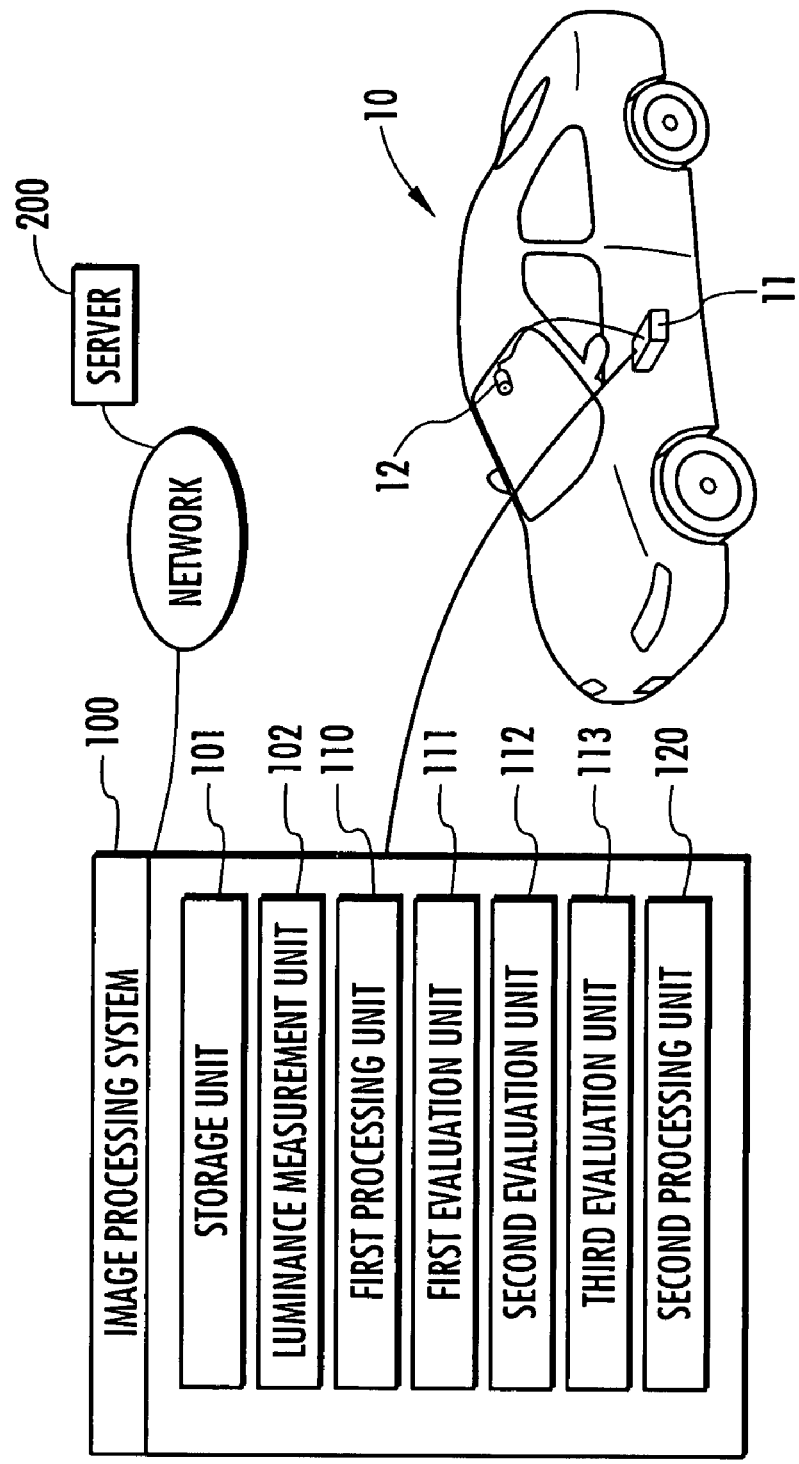
FIG. 1 is a configuration schematic diagram of an image processing system according to one embodiment of the present invention.
Figure 2:
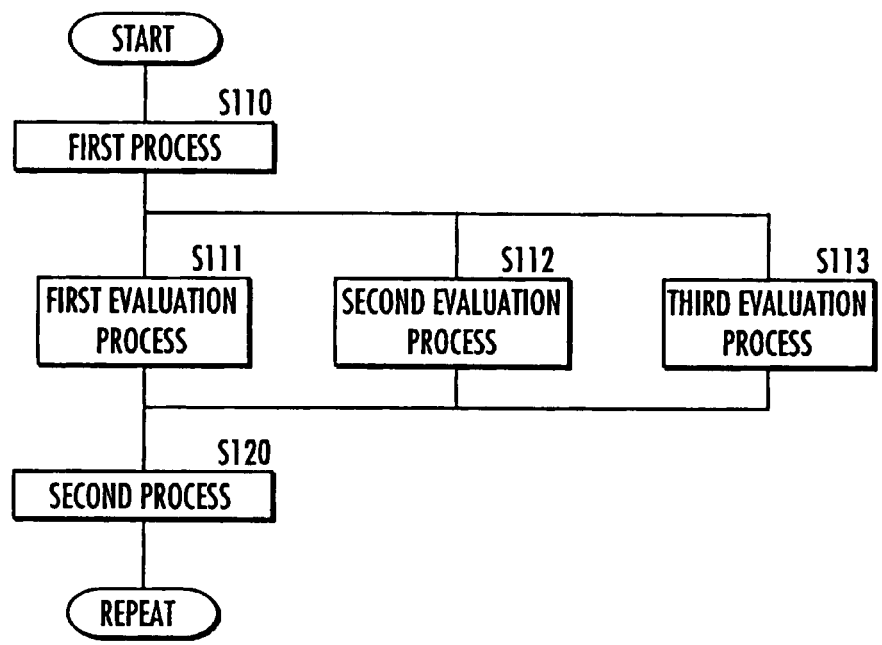
FIG. 2 is an explanatory diagram of an image processing method according to one embodiment of the present invention.
Figure 3:
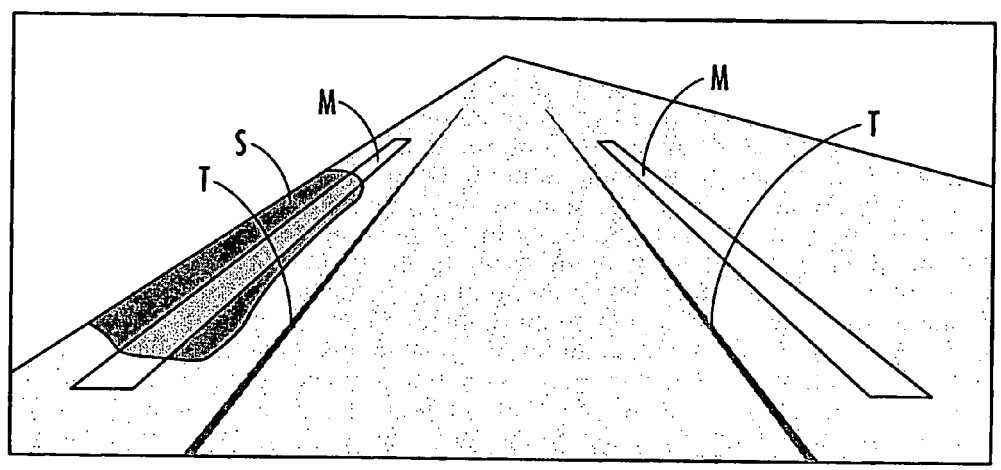
FIG. 3 is an illustrative diagram of a road image.
Figure 4:
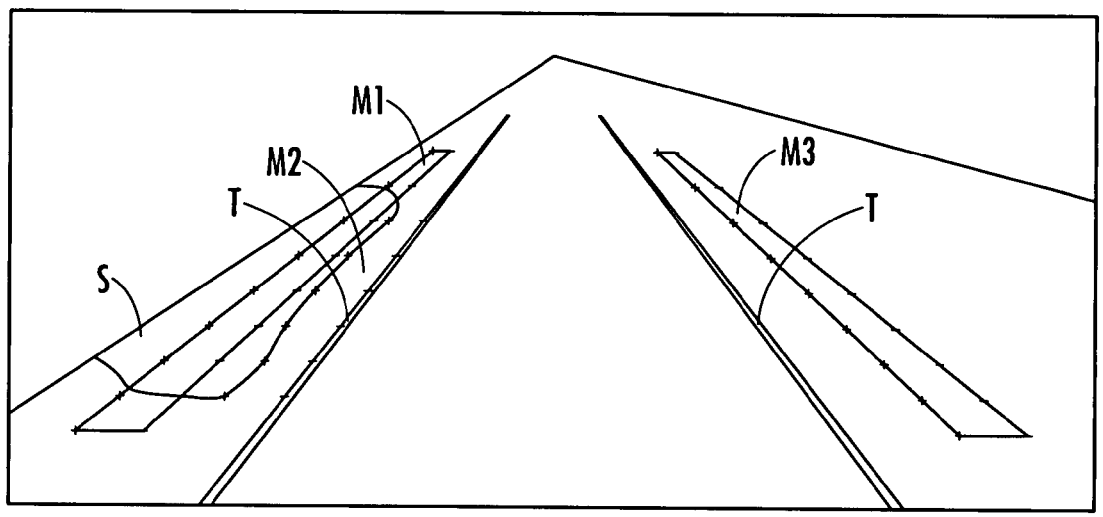
FIG. 4 is an illustrative diagram of a recognition result of a lane mark candidate.
Figure 5A:
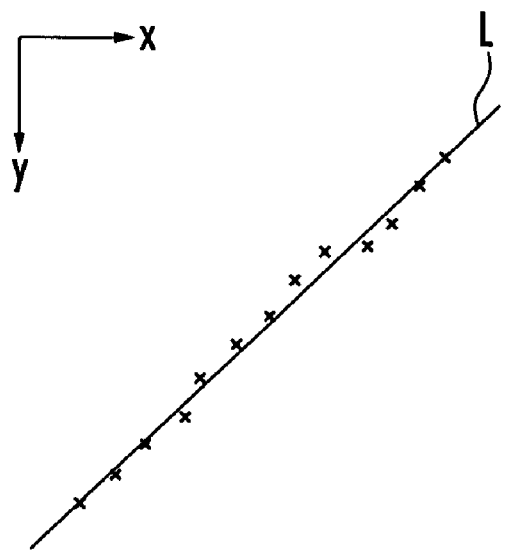
FIG. 5 is an explanatory diagram of the continuity of an edge of the lane mark candidate.
Figure 5B:
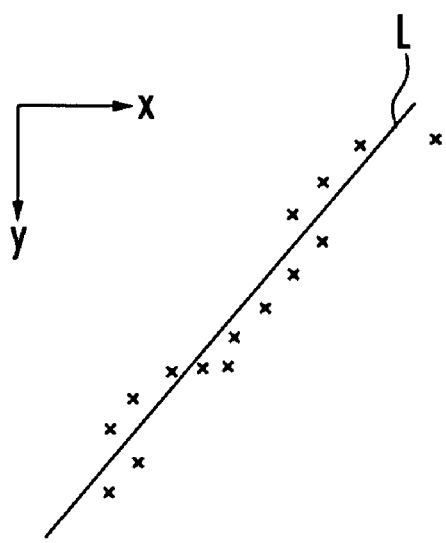
Figure 6A:
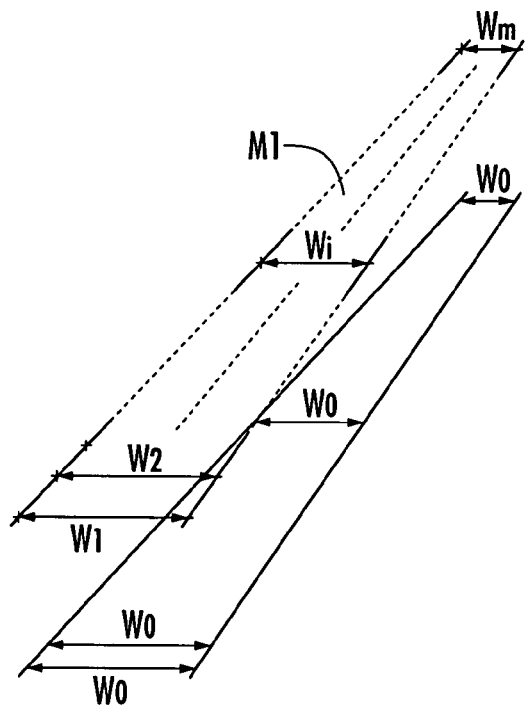
FIG. 6 is an explanatory diagram of the conformance between the width of the lane mark candidate and the lane mark standard width.
Figure 6B:
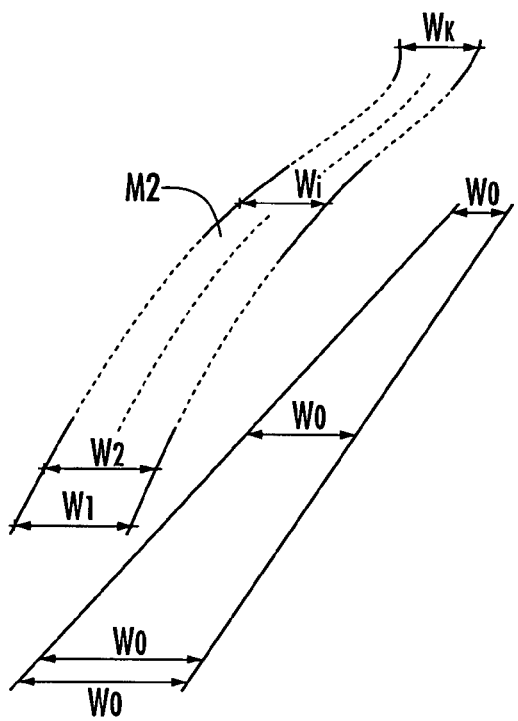
Figure 7A:
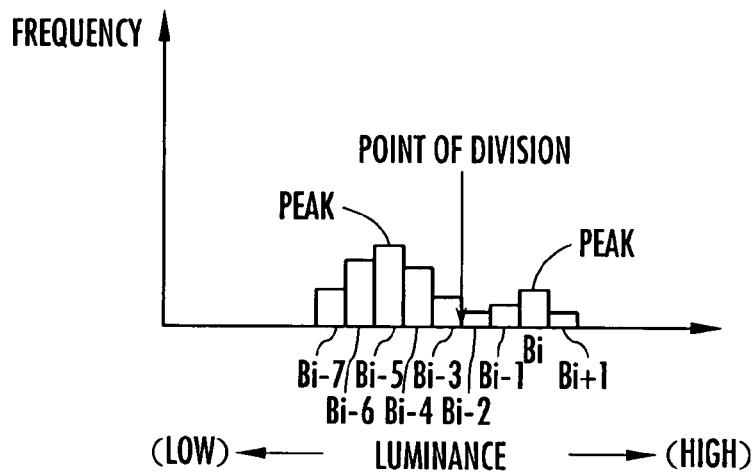
FIG. 7 is an explanatory diagram of the uniformity of the luminance of pixels contained in the lane mark candidate.
Figure 7B:
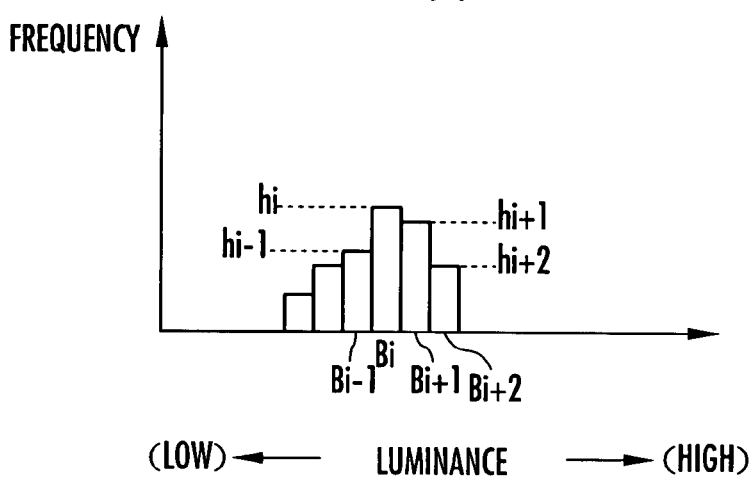
Figure 7C:
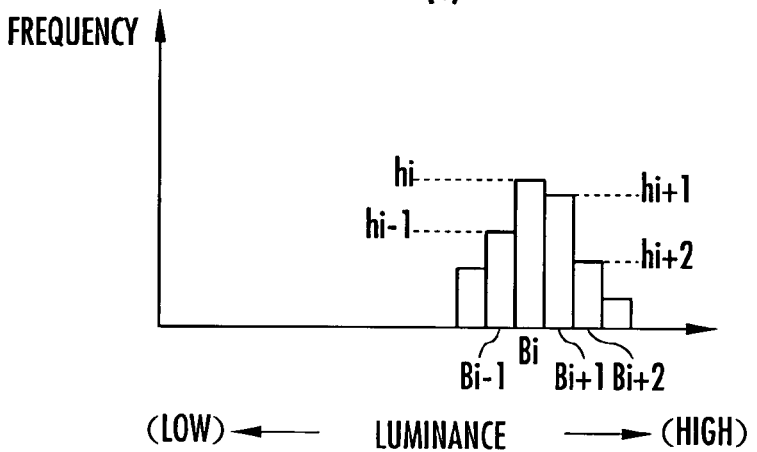

The invention claimed is:

1. An image processing system comprising:
a processor;
a memory operatively coupled to the processor;
a first processing unit which recognizes a lane mark candidate on the basis of the luminance of each pixel in a road image captured by a vehicle-mounted imaging device;
a first evaluation unit which evaluates a first index which represents continuity of an edge of the lane mark candidate recognized by the first processing unit;
a second evaluation unit which evaluates a second index which represents conformance between the width of the lane mark candidate recognized by the first processing unit and a lane mark standard width;
a third evaluation unit which generates a luminance histogram of pixels contained in the lane mark candidate recognized by the first processing unit and then evaluates a third index which represents a variation in the luminance space of the histogram; and
a second processing unit which recognizes a lane mark candidate most likely to
be a true lane mark as a lane mark on the basis of the first, second, and third indices
evaluated by the first, second, and third evaluation units, respectively,
wherein the histogram is configured to determine at least one lane mark candidate in shaded regions.

2. An image processing system according to claim 1, wherein the first evaluation unit sets an approximate expression of the edge of the lane mark candidate on the basis of a plurality of edge points of the lane mark candidate recognized by the first processing unit and evaluates the first index according to an increasing function of a difference between the plurality of edge points and the approximate expression.

3. An image processing system according to claim 1, wherein the second evaluation unit selects a lane mark standard width closest to the width of the lane mark candidate recognized by the first processing unit among a plurality of lane mark standard widths and evaluates the second index according to an increasing function of a deviation between the width of the lane mark candidate and the selected lane mark standard width.

4. An image processing system according to claim 1, wherein the third evaluation unit divides the histogram so as to include only one peak, calculates indices each representing the variation in the luminance space of each divided histogram, and evaluates the third index on the basis of the indices if the histogram contains a plurality of peaks.

5. An image processing system according to claim 1, wherein the third evaluation unit calculates a standard deviation as the index representing the variation in the luminance space of the histogram and evaluates the standard deviation as the third index.

6. An image processing system according to claim 1, wherein, if the first index evaluated by the first evaluation unit falls outside a first allowable range or if the second index evaluated by the second evaluation unit falls outside a second allowable range, the second processing unit recognizes the lane mark with the importance of the third index being set to be higher than the importance of the first index and that of the second index.

7. An image processing method comprising:
   a first processing step of recognizing a lane mark candidate on the basis of the luminance of each pixel in a road image captured by a vehicle-mounted imaging device;
   a first evaluation step of evaluating a first index which represents continuity of an edge of the lane mark candidate recognized in the first processing step;
   a second evaluation step of evaluating a second index which represents conformance between the width of the lane mark candidate recognized in the first processing step and a lane mark standard width;
   a third evaluation step of generating a luminance histogram of pixels contained in the lane mark candidate recognized in the first processing step and evaluating a third index which represents a variation in the luminance space of the histogram; and
   a second processing step of recognizing a lane mark candidate most likely to be a true lane mark as a lane mark on the basis of the first, second, and third indices evaluated by in the first, second, and third evaluation units steps, respectively,
   wherein the histogram is configured to determine at least one lane mark candidate in shaded regions.

8. An image processing program embedded in a non-transitory machine-readable medium, the image processing program causing a computer to perform:
   a first processing function of recognizing a lane mark candidate on the basis of the luminance of each pixel in a road image captured by a vehicle-mounted imaging device;
   a first evaluation function of evaluating a first index which represents continuity of an edge of the lane mark candidate recognized by the first processing function;
   a second evaluation function of evaluating a second index which represents conformance between the width of the lane mark candidate recognized by the first processing function and a lane mark standard width;
   a third evaluation function of generating a luminance histogram of pixels contained in the lane mark candidate recognized by the first processing function and evaluating a third index which represents a variation in the luminance space of the histogram; and
   a second processing function of recognizing a lane mark candidate most likely to be a true lane mark as a lane mark on the basis of the first, second, and third indices evaluated by the first, second, and third evaluation functions, respectively
   wherein the histogram is configured to determine at least one lane mark candidate in shaded regions.

9. The image processing program according to claim 8, wherein part of all of the program is downloaded to an in-vehicle computer.

10. The image processing program according to claim 8, wherein the program is hosted on a server.

11. A vehicle equipped with:
    an imaging device;
    an image processing system which performs image processing on the basis of a road image captured by the imaging device; and
    a vehicle running condition control system which controls a running condition of the vehicle on the basis of a result of the image processing performed by the image processing system,
    wherein the image processing system includes:
    a first processing unit which recognizes a lane mark candidate on the basis of the luminance of each pixel in the road image captured by the imaging device;
    a first evaluation unit which evaluates a first index which represents continuity of an edge of the lane mark candidate recognized by the first processing unit;
    a second evaluation unit which evaluates a second index which represents conformance between the width of the lane mark candidate recognized by the first processing unit and a lane mark standard width;
    a third evaluation unit which generates a luminance histogram of pixels contained in the lane mark candidate recognized by the first processing unit and then evaluates a third index which represents a variation in the luminance space of the histogram; and
    a second processing unit which recognizes a lane mark candidate most likely to be a true lane mark as a lane mark on the basis of the first, second, and third indices evaluated by the first, second, and third evaluation units, respectively,
    wherein the histogram is configured to determine at least one lane mark candidate in shaded regions.

12. A vehicle according to claim 11, wherein the first evaluation unit sets an approximate expression of the edge of the lane mark candidate on the basis of a plurality of edge points of the lane mark candidate recognized by the first processing unit and evaluates the first index according to an increasing function of a difference between the plurality of edge points and the approximate expression.

13. A vehicle according to claim 11, wherein the second evaluation unit selects a lane mark standard width closest to the width of the lane mark candidate recognized by the first processing unit among a plurality of lane mark standard widths and evaluates the second index according to an increasing function of a deviation between the width of the lane mark candidate and the selected lane mark standard width.

14. A vehicle according to claim 11, wherein the third evaluation unit divides the histogram so as to include only one peak, calculates indices each representing the variation in the luminance space of each divided histogram, and evaluates the third index on the basis of the indices if the histogram contains a plurality of peaks.

15. A vehicle according to claim 11, wherein the third evaluation unit calculates a standard deviation as an index representing the variation in the luminance space of the histogram and evaluates the standard deviation as the third index.

16. A vehicle according to claim 11, wherein, if the first index evaluated by the first evaluation unit falls outside a first allowable range or if the second index evaluated by the second evaluation unit falls outside a second allowable range, the second processing unit recognizes the lane mark with the importance of the third index being set to be higher than the importance of the first index and that of the second index.

* * * * *